April 22, 1930.                L. C. MARTINSEN                1,755,186
                                 TRANSMISSION
                              Filed Jan. 31, 1930

INVENTOR.
Leonard C. Martinsen
BY
Philip A. Ferrell
ATTORNEY.

Patented Apr. 22, 1930                                                   1,755,186

UNITED STATES PATENT OFFICE

LEONARD C. MARTINSEN, OF KIMBALLTON, IOWA

TRANSMISSION

Application filed January 31, 1930. Serial No. 424,876.

The invention relates to governor controlled friction differentials, particularly adapted for use in connection with motor vehicles, and in connection with the mechanism shown in my Patent #1,707,635, and has for its object to provide a friction differential constructed in a manner whereby various speeds can be obtained by controlling the speed of rotation of the propeller or drive shaft.

A further object is to extend the adjacent ends of the wheel drive shaft into a rotatable bearing sleeve, and to provide friction gear connections between the adjacent ends of the wheel drive shafts instead of toothed gear connections, and to mount the large friction disc on the sleeve in a manner whereby the governor controlled friction drive wheel may move towards and away from the axis of the friction disc.

A further object is to mount the friction drive wheel on a sleeve slidably keyed on the propeller shaft and to provide opposite sides of the propeller shaft with racks with which gear segments carried by the sleeve mesh. Also to provide governor means in connection with the gear segments, whereby upon increasing or diminishing the speed of rotation of the propeller shaft, the speed of rotation of the drive disc will be varied.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
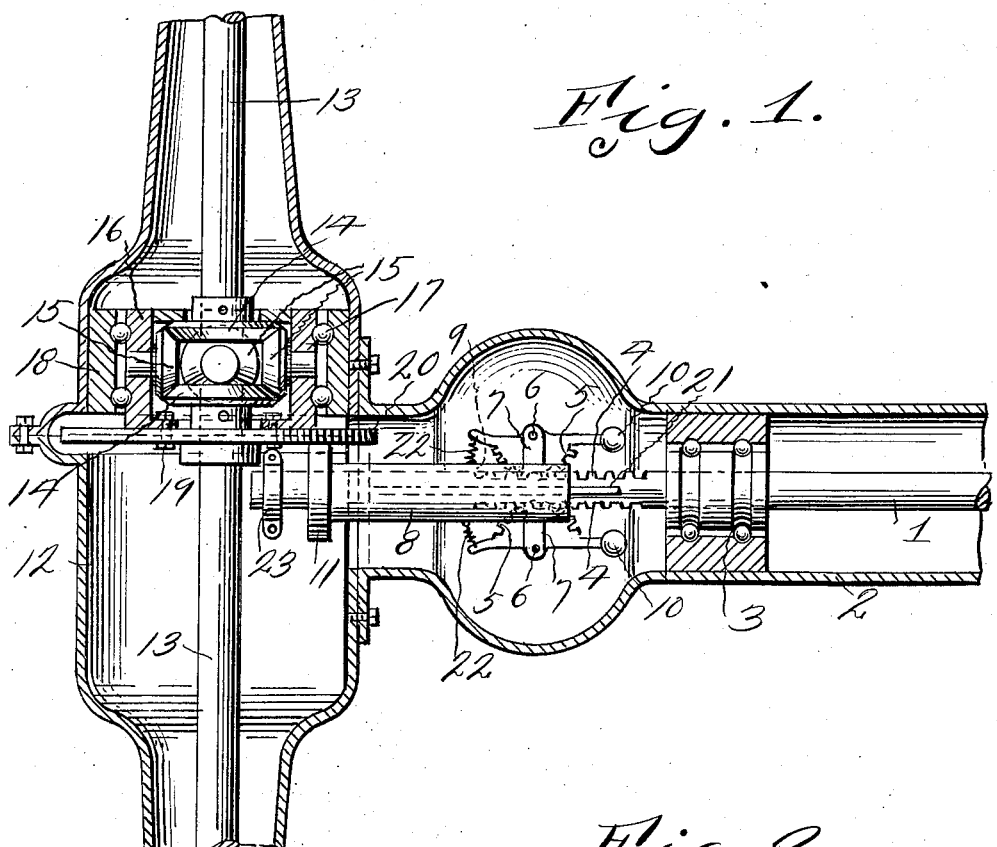
Figure 1 is a horizontal sectional view through the differential.
Figure 2:
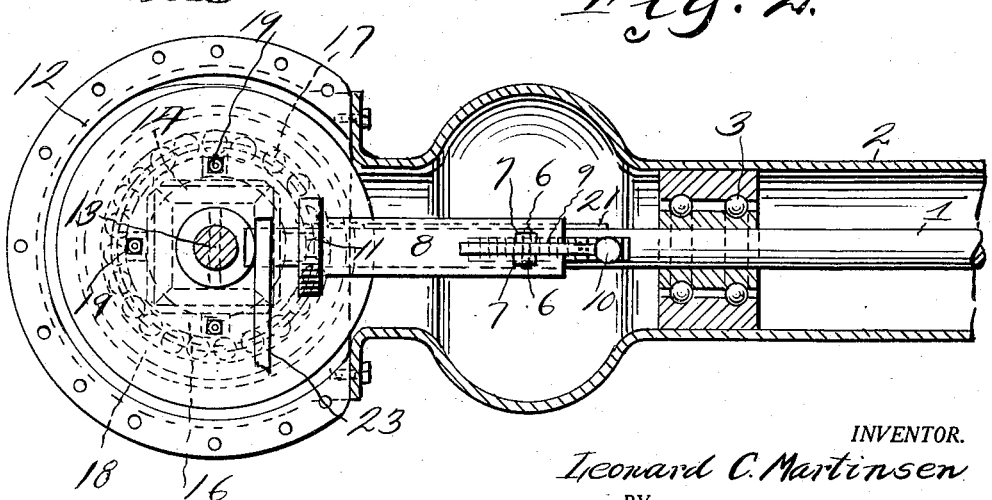
Figure 2 is a vertical longitudinal sectional view through the differential.

Referring to the drawing the numeral 1 designates the drive shaft of the vehicle which extends rearwardly through the casing 2 and is antifrictionally mounted at 3. The rear end of the drive shaft 1 has its opposite sides provided with racks 4, with which the gear segments 5 of the governors mesh. The gear segments are pivotally mounted at 6 between ears 7 carried by the longitudinally movable sleeve 8, and as the gear segments extend through slots 9 in the sleeve 8, it will be seen that when the weighted ends 10 of the gear segments are forced outwardly under centrifugal force, the sleeve 8 will move longitudinally for moving the friction drive wheel 11.

Disposed within the differential housing 12, are axially alined driven shafts 13, which lead to wheels of conventional construction. The inner adjacent ends of the driven shafts 13 have mounted thereon bevelled friction gears 14, which engage frictionally idle gears 15 carried by the inner bearing rings 16 for allowing differential movement of the driven shafts 13 in the usual manner. Bearing ring 16 is mounted on the antifrictional ball bearings 17 carried by the sleeve 18 within the differential housing 12, therefore it will be seen that with the ring 16 antifrictionally mounted, the same may freely rotate during the driving operation, without interfering with the differential movement of the driven shafts 13. The inner end of the sleeve 16 has secured thereto by means of bolts 19 a driven disc 20, with which the friction drive wheel 11 engages. It will be seen that during the rotation of the driven shaft 1 with the friction drive wheel 11 in engagement with the disc 20, disc 20 will be rotated.

Sleeve 18 is slidably mounted on the drive shaft 1, but is rotatable therewith incident to the key 21. The friction drive wheel 11 is stationary adjacent the outer side of the friction drive disc 20, when the shaft 1 is at rest, and as the speed of rotation of the shaft 1 increases, the centrifugal action of the weighted ends 10 of the governor pivotally moves the gear segments 5, and as said gear segments are pivotally mounted on the sleeve 8, said sleeve and the friction drive wheel 11 are moved inwardly towards the axis of the driven disc 20 for increasing the speed of the driven shafts 13. Compressible springs 22 are provided connecting the sleeve 8 and the adjacent portions of the segments, and which springs form means for insuring a positive action of the governors and return of the sleeve to normal position when speed is reduced.

Differential housing 12 is preferably formed in sections for allowing the parts to be assembled therein, however applicant does not limit himself in this particular. Extending upwardly within the differential housing 12 is a bracket 23 for supporting the inner end of the drive shaft 1.

From the above it will be seen that a friction governor control differential is provided, which is particularly adapted for use in connection with motor driven vehicles, however, applicable for general use.

The invention having been set forth what is claimed as new and useful is:—

1. A differential comprising axially alined driven shafts, gear train connections between the adjacent ends of the driven shafts, an antifrictionally mounted bearing sleeve supporting said gear connections, a friction drive disc carried by said sleeve, a drive friction wheel engaging said disc, a drive shaft, a sleeve carried by said drive wheel, said sleeve being longitudinally feathered on the drive shaft, centrifugally controlled gear segments carried by the sleeve, racks carried by opposite sides of the drive shaft with which the gear segments mesh.

2. The combination with a differential mechanism having a driven disc, of means for driving said disc, said means comprising a drive shaft at a right angle to the axis of the driven disc, a sleeve slidably keyed on the drive shaft, a friction wheel carried by said sleeve, said friction wheel having its periphery in engagement with the driven disc, gear segments pivotally mounted on the sleeve at opposite sides thereof, racks on opposite sides of the drive shaft, said gear segments extending through slots in the sleeve, weights carried by said gear segments at one side thereof for pivotally moving the gear segments under centrifugal force and springs cooperating with the gear segments for returning the same to normal position upon stopping of the drive shaft.

3. The combination with a differential comprising adjacent driven shaft ends having friction bevel gear drive connections, a rotatable sleeve supporting said drive connection, a driven disc carried by said sleeve, of a governor control drive wheel engaging the drive disc.

In testimony whereof he hereunto affixes his signature.

LEONARD C. MARTINSEN.